United States Patent [19]

Fuchs et al.

[11] Patent Number: 4,634,168
[45] Date of Patent: Jan. 6, 1987

[54] BRACKET FOR MOUNTING A TRUCK BODY ON A CHASSIS

[75] Inventors: Daniel G. Fuchs, Charlotte, N.C.; Larry R. Rudd, Quincy, Ill.

[73] Assignee: Knappheide Mfg. Co., Quincy, Ill.

[21] Appl. No.: 829,023

[22] Filed: Feb. 13, 1986

Related U.S. Application Data

[63] Continuation-in-part of Ser. No. 593,839, Mar. 27, 1984, abandoned.

[51] Int. Cl.$^4$ .................. B62D 21/02; B62D 23/00
[52] U.S. Cl. .......................... 296/35.1; 280/785; 296/204
[58] Field of Search ............. 296/35.1, 35.3, 181, 296/182, 195, 204; 280/781, 783, 785, 789, 760, 762; 293/155

[56] References Cited

U.S. PATENT DOCUMENTS

| | | | |
|---|---|---|---|
| 86,418 | 2/1869 | Kochensperger | 296/35.1 |
| 1,230,748 | 6/1917 | Mayer | 296/35.1 |
| 1,630,374 | 5/1927 | Cox | 293/155 |
| 1,927,032 | 9/1933 | Heil | 296/35.1 |
| 2,141,267 | 12/1938 | Dillon | 180/77 |
| 2,470,919 | 5/1949 | Cole | 296/35.1 |
| 2,639,187 | 5/1953 | Grumbache | 296/182 X |
| 2,867,472 | 1/1959 | Harper | 296/35.1 |
| 3,097,879 | 7/1963 | Looper | 296/35.1 |

FOREIGN PATENT DOCUMENTS 0214496 12/1983 Japan ........................ 296/204

Primary Examiner—Robert B. Reeves
Assistant Examiner—Russell D. Stormer
Attorney, Agent, or Firm—Hall, Myers & Rose

[57] ABSTRACT

An integral rear end bracket for facilitating the mounting and proper positioning of a prefabricated truck body onto a prefabricated truck chassis when the bracket is attached to the rear end of the chassis' longitudinal frame member. The bracket includes a plate member having a hook-like profile comprised of a stem portion and hook portion. The stem portion extends rearwardly of the chassis and the hook portion extends upwardly and rearwardly. The hook is so located that a forward portion of a usually C-shaped cross-member of the truck body contacts the hook when the body is at the proper position on the chassis and serves not only to locate the body but prevent forward movement thereof. The stem portion of the hook may be provided with preset holes which align with standard holes in the chassis frame for connection thereto. The stem portion may have further extending rearwardly therefrom a flange which properly locates and connects a bumper to the chassis.

9 Claims, 11 Drawing Figures

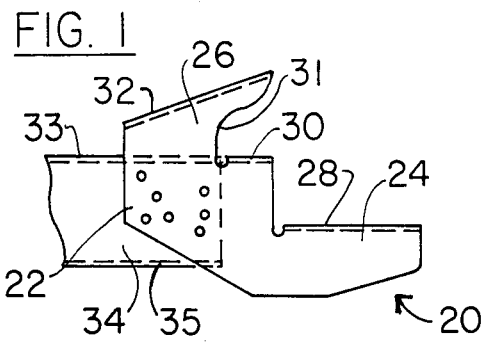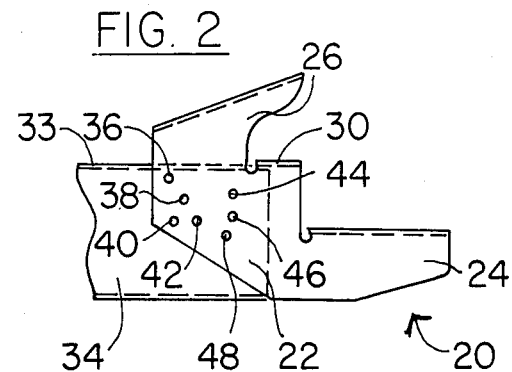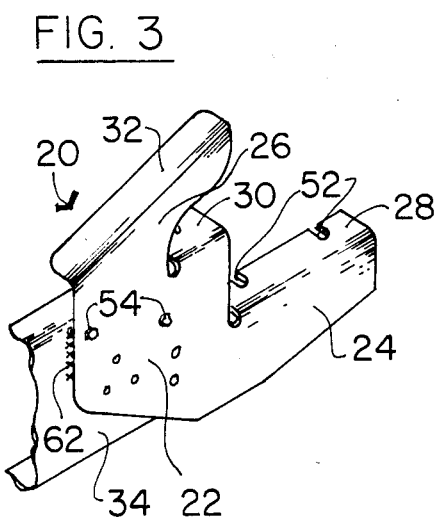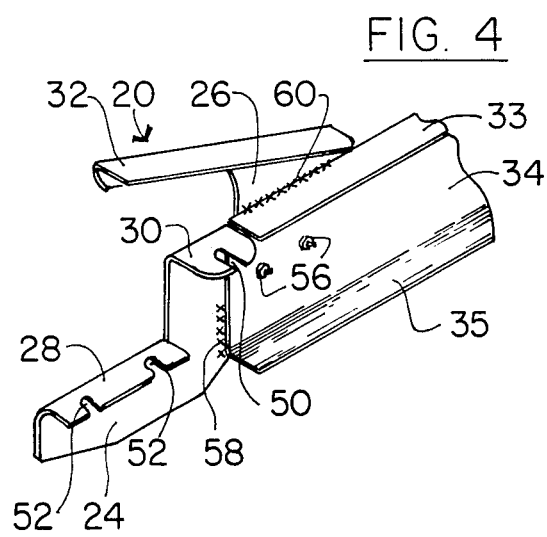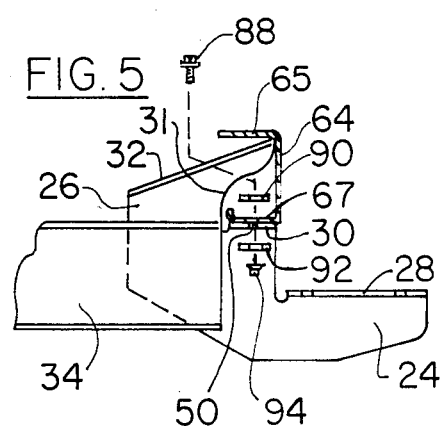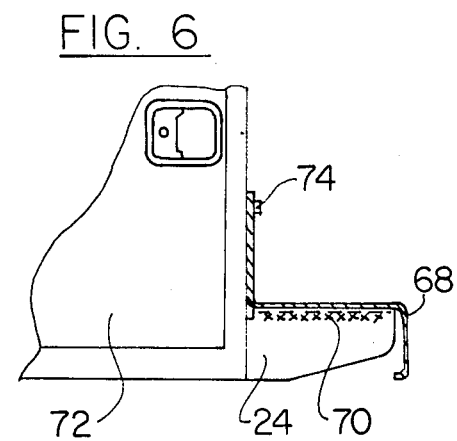

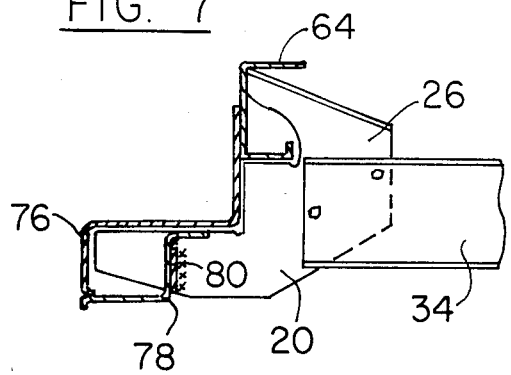
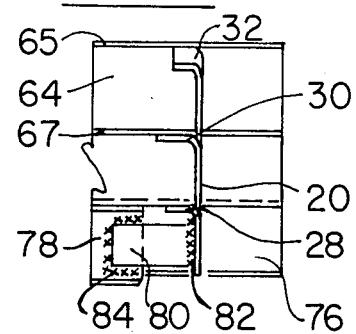
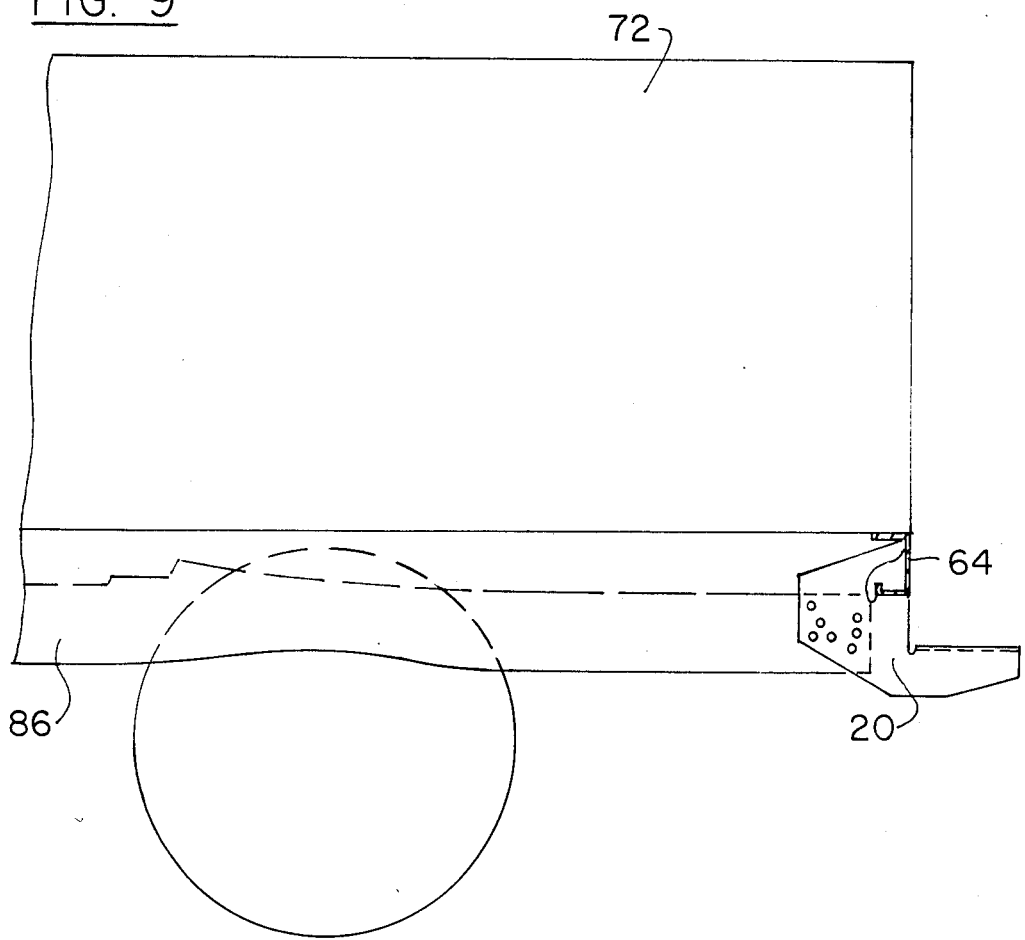

BRACKET FOR MOUNTING A TRUCK BODY ON A CHASSIS

RELATED APPLICATION

This is a continuation-in-part of co-pending application Ser. No. 593,839 filed Mar. 27, 1984, now abandoned.

FIELD OF THE INVENTION

This invention relates to brackets for attaching a truck body to a truck chassis. More particularly, this invention relates to brackets which are designed and arranged to be attached to the side rails of a truck chassis near the rear ends of the side rails, and to the truck body.

BACKGROUND OF THE INVENTION

When a person goes to a truck dealer or distributor with a desire to purchase a truck for a particular purpose (such as a garbage truck, dump truck, cement mixer, etc.), the truck customer usually has two basic decisions to make. First, the customer must select which make and model of truck chassis the customer wants to purchase, and second, the make and model of truck body the customer wants to purchase. These decisions must be made simultaneously to assure that the chosen chassis and body are compatible. Once the customer has selected a chassis and a truck body, and the chassis and truck body have been delivered to a common location, the truck body can then be mounted on the truck chassis to form a complete truck as desired by the customer. After the body has been mounted, in many situations, a bumper is placed at the rear of the truck to comply with Federal and State safety regulations.

An example of the above is a solid waste collection company which desires to purchase a new garbage collection truck. A representative or representatives of the company will select a make and model of truck chassis, such as a Ford F350, GMC C30, etc., and also select a garbage truck body which is compatible with the chassis. The garbage truck body is then mounted on the chassis to form a new garbage truck.

Regardless of the type of truck, or the truck's end use, the truck body, of course, has to be fixedly attached to the chassis before the truck can be operated for its intended purpose. This is usually accomplished by having points of attachment of the truck body to the chassis at a location near the front of the assembly and at a location near the rear of the assembly.

The front end of the truck bodies are usually attached to the front portions of the chassis side rails by U-bolts, U-bolt ties or other similar fastening devices and techniques. This invention addresses the attachment of the truck body to the truck chassis near the rear of the assembly.

There are many methods and devices that have been and are currently employed to mount and fixedly attach the rear portions of the truck bodies to the rear portions of the side rails of truck chassis. For the most part, these methods and devices include angle irons or channels which are usually welded to the truck bodies and bolted to the truck chassis or extension members which are often added to the ends of the side rails of the truck chassis so that the side rails plus extension members are of a length sufficient to properly support the truck body and also leave a desired gap between the truck cab and truck body. The extension members are usually elongated members which are welded to each of the rear ends of the side rails of the chassis. The truck body is then lowered on the chassis frame and squared and centered on the chassis frame. After the truck body has been positioned in its final desired location on the chassis, various mounting brackets are selected and temporarily positioned (as by clamps) against the body and chassis.

The next step in these prior art truck body mounting methods employing the prior art mounting devices is to weld the brackets to the truck body and to mark on the chassis frame, using the brackets now welded to the truck body as templates, the locations for holes to be placed in the chassis frame for bolts to pass through.

The truck body is then removed from the chassis, and the proper diameter holes are drilled in the chassis frame where marked. The body is then remounted on the chassis frame by bolting the brackets to the chassis.

Even after all this work is finished, the truck may not yet be ready for use since it does not have a rear bumper thereon as sometimes required by Federal and State safety regulations. Thus, the addition of a rear bumper to the assembly is necessary in certain situations. This is usually accomplished by positioning and holding the bumper against the assembled body and chassis and again welding brackets to the body and/or chassis, drilling holes in the chassis and/or body and bolting the bumper to the body and/or chassis. This is an at least two-man job due to the bulk and length of the bumpers commonly employed.

As illustrated by the above, the past devices and techniques for attaching a truck body to a truck chassis at the rear of the assembly involve multistep operations which include the placing and replacing of the truck body on the truck chassis, welding underneath the vehicle, aligning the heavy body on the chassis at least twice, etc. This cumbersome activity is time-consuming and requires a certain level of experience, foresight and knowledge before it can be undertaken. Moreover, even after the truck body is mounted on the chassis, additional holes and brackets must be added to attach a rear bumper to the truck assembly. The fact that the prior devices are time-consuming to employ and require a skilled person for proper use, renders the use of these prior art devices unnecessarily expensive.

Thus, it is apparent that there exists a need in the art for mounting brackets for mounting a truck body on a truck chassis frame which enable a truck body to be quickly and easily mounted on a truck chassis, and also optionally provide a manner of quickly and easily attaching a bumper onto the assembled truck chassis and body.

This invention satisfies this need, as well as other needs apparent to those skilled in the art by generally speaking, providing:

An integral rear end bracket means for facilitating the mounting and proper positioning of a prefabricated truck body having a generally C-shaped rearward cross-member comprised of an upper flange and a lower flange with a joining rear wall having an inner surface onto a prefabricated truck chassis which is provided with at least one longitudinal frame member, said bracket means comprising: a plate member having a hook-like profile comprised of a stem portion and a hook portion wherein when mounted, the stem portion extends in a rearward, substantially longitudinal direction behind the chassis, and wherein the hook portion extends in an upward and rearward direction, the hooklike profile being of such a dimension and contour that when mounted in combination with said truck body and chassis the hook portion of the profile accommodates the cross-member and resides proximate to the inner surface of the joining wall of the C-shaped cross-member, thereby preventing the body from any significant further forward movement with respect to the chassis, the hook portion being located proximal a side wall of the longitudinal frame of the chassis for connection thereto when the hook portion is proximal the inner surface of the cross-member, and wherein the bracket is of such a configuration and size that when the hook portion is proximate to the inner surface of the cross-member, the body is properly positioned with respect to the chassis.

In some embodiments of this invention, the plate member's stem portion has a number of holes positioned therein such that the holes align with a variety of holes which are now found in the extreme rear portions of the side rails of popular American-made truck chassis. For example, while a Dodge truck chassis model and a GMC truck chassis model may each have two holes located in the extreme rear portions of their respective side rails, these pairs of holes are not in a standard, or the same, position. By having a variety of holes, in the first portion, as per these embodiments, a single bracket is compatible with a number of American-made truck chassis.

In other embodiments, the stem portion referred to above may be provided with a flange which is disposed perpendicularly to the plate member. This flange may have means for receiving a bolt therethrough, so that a truck body can be attached to this flange by a bolt assembly.

In certain other embodiments of this invention, the stem portion may further include an extension thereof in the rearward direction which is designed and arranged so as to provide a flange which is capable of properly locating and securing a rear bumper thereto and with respect to the body and chassis.

The truck body mounting brackets according to this invention have many advantages over the prior brackets and other devices employed to mount a truck body on a chassis. These advantages include, but are not limited to, the following:

The brackets defined by this invention perform the functions which previously were performed by as many as five different prior art brackets and other attaching means on a single truck. The brackets are the sole connection members between the rear of a truck chassis and the rear of a truck body. This feature greatly simplifies the operation of mounting a truck body on a chassis, including reducing the time required to perform the mounting. This, in turn, reduces the level of skill required to install a truck body on a chassis and reduces the possibility of installer errors.

Another advantage of this invention is that by using brackets according to this invention, the need to extend the side rails of most truck chassis frames, which is almost always required when employing the prior art mounting devices, is eliminated. The holes in the bracket are placed such that the brackets, when properly installed, extend a predetermined distance beyond the chassis. This distance is set so that the brackets properly position a truck body on the chassis, leaving the desired gap between the truck body and truck cab.

Yet another advantage is that the brackets according to this invention utilize the existing holes in the side rails of popular American-made truck chassis so that additional holes do not have to be drilled in the side rails. This feature eliminates the step necessary in using the prior art brackets or other attaching means of measuring the locations on the chassis side rails for drilling additional holes in the side rails.

A further advantage of this invention is that the bracket functions as a barrier which helps prevent the truck body from sliding forward relative to the truck chassis if the truck embodying a bracket according to this invention is involved in an accident, such as if the truck runs into the rear of another vehicle. This is of great benefit in enabling the truck to comply with various Federal and State safety regulations.

The brackets according to this invention also possess the advantage that truck bodies are automatically positioned when the bodies are placed on the chassis and attached to the brackets. In using the prior brackets, the installer was required to make many different measurements and then make a final judgment as to whether or not the body was properly positioned. All of this guesswork and meticulous measuring, and the errors inherent in the same, are eliminated when using the brackets according to the present invention.

Another advantage is that the brackets may optionally provide surfaces to which a rear bumper can be easily and quickly attached. When using the prior art brackets, it was usually necessary to add additional brackets and other supports to fixedly attach the bumper to the truck. These additional brackets and supports are unnecessary when employing brackets according to this invention. Moreover, the brackets according to this invention are designed and arranged such that the bumper is positioned in the proper relationship to the body, including height, by the brackets.

A further advantage is that use of the brackets according to this invention reduces the man-hours required to install a bumper by providing a surface which enables one man to install a bumper. The prior art brackets require at least two men to lift the bumper, block it up in the proper position and install the same.

The brackets according to this invention also have the advantage that the vertical loads the body exerts on the bracket are directly carried by the bracket. This provides full, rugged support for the body.

Moreover, the use of brackets according to this invention provides an additional deterrent to a body being moved too far forward relative to the chassis as the body is being positioned and installed on the chassis. If a body is moved too far forward, it may damage the truck cab. Occasionally when a body is being positioned and installed on a chassis, the body will be accidentally swung or otherwise moved too far forward and will bump the cab. The brackets according to this invention reduce occurrences of these mishaps, it being remembered that the brackets are placed on the chassis prior to the time that the body is placed on the chassis.

In summary, it is clear from the above that this invention possesses many advantages and benefits not found in any prior art brackets.

This invention will now be described with reference to the Figures, wherein:

IN THE DRAWINGS

FIG. 1 is a side view of one embodiment of this invention attached to a side rail of a truck chassis model.

FIG. 2 is a side view of the embodiment of this invention illustrated in FIG. 1 attached to a side rail of a second truck chassis model.

FIG. 3 is a perspective view of the embodiment of this invention illustrated in FIGS. 1 and 2 attached to a side rail of a truck chassis.

FIG. 4 is a second perspective view of the bracket and side rail assembly illustrated in FIG. 3.

FIG. 5 is a side view, partially sectioned for clarity, illustrating the embodiment of this invention and side rail illustrated in FIG. 1 with an end rail of a truck body mounted thereon.

FIG. 6 is a partial side view of an assembled truck body, bumper and the embodiment of this invention illustrated in FIGS. 1-5.

FIG. 7 is a side view, partially sectionalized for clarity, illustrating a second type of bumper assembly mounted on the embodiment of this invention illustrated in FIGS. 1-6.

FIG. 8 is a partial rear view of the bumper assembly, embodiment of this invention and truck body illustrated in FIG. 7.

FIG. 9 is a partial side view illustrating the embodiment of this invention illustrated in FIGS. 1-8 mounted on a truck chassis and having a truck body mounted on the embodiment and the truck chassis.

DETAILED DESCRIPTION OF THE DRAWINGS

Figure 10:
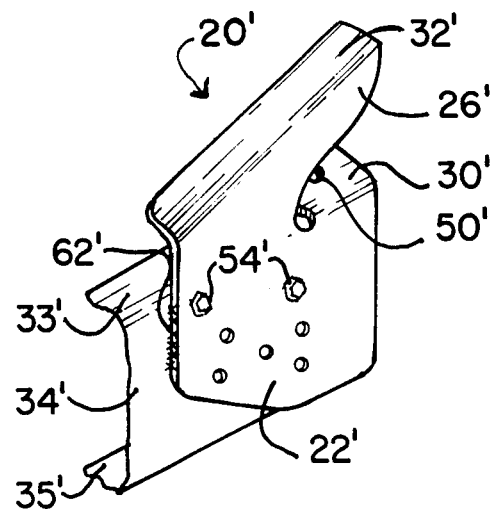
FIG. 10 is an outside, side perspective view of another embodiment of this invention attached to a side rail of a truck chassis model.

Referring to the Figures, in particular FIGS. 1-4, an embodiment of this invention is disclosed which comprises mounting bracket 20, bracket 20 being designed to be attached to the rear ends of truck chassis side rails 34 and have a truck body, such as truck body 72, mounted thereon (as shown in FIGS. 7 and 9).

Mounting bracket 20, in the embodiment illustrated in the Figures, is in the shape of a "J", or hooklike arrangement, having a hook portion and a stem portion. It comprises a unitary piece of metal which includes plate portion 22, rearward extending portion 24, upward extending hook portion 26, bumper mount flange 28, mounting flange 30 and upper flange 32. The stem portion includes in this embodiment items 22 and 24. (Items 30 and 28 may be referred to as flanges extending from the stem portion.)

Plate portion 22, rearward extending portion 24, and upward extending hook portion 26 comprise a continuous flat plate. Bumper mount flange 28, mounting flange 30, and upper flange 32 are flat surfaces which extend perpendicularly from the upper edges of rearward portion 24, plate portion 22 and upward portion 26, respectively, as shown in FIGS. 1-5.

Mounting bracket 20 is designed to be employed in the environment of a truck chassis, such as chassis 86 in FIG. 9, having a pair of spaced side rails, such as side rails 34, which extend rearwardly from the cab of the chassis, and a truck body, such as truck body 72, having a lateral truck body end rail, such as end rail 64. Side rails 34 are usually channels having top flanges 33 and bottom flanges 35. Flanges 33 and 35 are disposed horizontally as shown in the Figures. Truck body end rail 64 also has a top flange 65 and a bottom flange 67 which are horizontally disposed.

Mounting bracket 20 is designed and arranged to be mounted on the rear portion of a chassis side rail 34. To properly employ bracket 20 in the environment discussed above, a mounting bracket 20 is placed on the end of each of the two side rails 34 with flanges 28, 30 and 32 being directed inwardly. That is, a mounting bracket 20 is placed on the left side rail 34 with its respective flanges 28, 30 and 32 pointing to the right and a mounting bracket 20 is placed on the right side rail 34 with its respective flanges 28, 30 and 32 pointing to the left.

Figure 11:
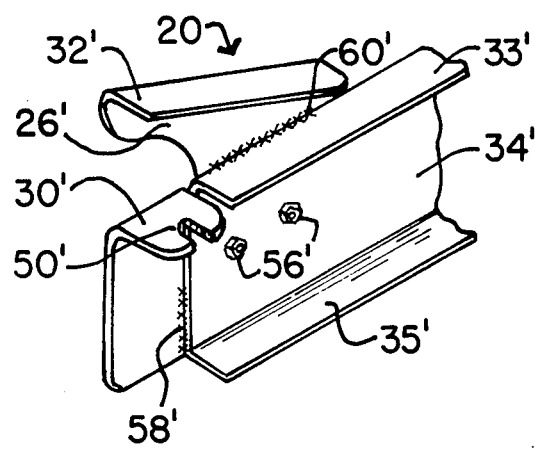
FIG. 11 is an inside, side perspective view of the embodiment of FIG. 10.

Plate portion 22 has a number of holes therein, for example, holes 36, 38, 40, 42, 44, 46 and 48. The location of these holes, in the embodiment illustrated in the Figures, is selected such that at least one of the holes aligns with at least one hole in the chassis side rails of the popular models of American-made truck chassis when the brackets 20 are properly assembled on a truck chassis. Stated differently, the popular truck chassis manufactured by U.S. manufacturers come from the factory with holes already placed near the ends of the chassis side rails. However, these holes are in non-standard positions such that the holes in the side rails of the different makes and models of truck chassis vary as to relative position. Holes 36, 38, 40, 42, 44, 46 and 48 are placed so that one or more (e.g. two, as shown in FIGS. 3, 4, 10 and 11) of these holes align with the pre-existing holes in the end of the chassis side rails when a bracket 20 is properly assembled on a truck chassis.

For example, as shown in FIG. 3, for one model of truck chassis, holes 36 and 44 may align with complementary holes in chassis side rails 34. Bolts 54 can then be inserted through these holes and nuts 56 (see FIG. 4) placed on the ends thereof to partially secure bracket 20 to end rail 34.

Mounting flange 30 has slot 50 therein which extends inward from the free edge of flange 30 (see FIG. 4). Likewise, bumper mount flange 28 has a pair of spaced slots 52 which extend inwardly from the free edge of bumper mount flange 28. In some embodiments, holes may be substituted for slots 50 and 52. The purpose of slots 50 and 52 will be described below. Upwardly extending portion 26 and upper flange 32 extend upward at an angle from body plate portion 22, as shown in the Figures. In this embodiment the tip end of upper extending hook portion 26 is designed to engage the inner upper corner surface of generally C-shaped end rail 64 when body 72 is mounted on bracket 20. In other embodiments, upper extending portion 26 could be designed to engage another element of body 72. Upwardly extending portion 26 has indentation 31 therein to receive lower flange 67 of end rail 64 (see FIGS. 1 and 5).

When mounting bracket 20 is properly installed on a truck chassis, mounting bracket 20 also provides a convenient apparatus to which a bumper can be attached, for example bumper 68 in FIG. 6. Bumper 68 is attached to mounting brackets 20 by bolt assemblies (not shown) which pass through holes in bumper 68 and slots 52 in bumper mount flange 28 and by welds 70. Bumper 68 may also be secured in place by attaching it to truck body 72 by bolt assemblies 74 or by welding.

FIGS. 7 and 8 illustrate another embodiment of a bumper, bumper 76, which can be employed with the embodiment of this invention illustrated in the Figures. Bumper 76 is of the ball hitch recess type (which is well known in the industry and thus not illustrated in detail in the Figures), and includes recess plate 78. Recess plate 78 is attached to mounting brackets 20 by mounting bars 80. Mounting bars 80 extend between mounting brackets 20 and recess plate 78 and are attached by welds 82 to mounting bracket 20 and by welds 84 to recess plate 78.

Mounting bracket 20 is installed on a truck chassis, such as chassis 86 as shown in FIG. 9, as follows:

Once a person who wants to purchase a truck chassis and a truck body selects the same and both are at hand at a common location, as discussed above, the steps necessary to mount the truck body on the chassis are undertaken. First, the chassis, such as chassis 86, must be prepared for having the truck body, such as truck body 72, mounted thereon. In the case of new chassis delivered directly from the factory, this usually involves the removal of chassis lights and the installation of fuel fill hoses. Any other items which would interfere with the placement of truck body 72 onto truck chassis 86 must also be removed.

Next, mounting brackets 20 are attached to the rear portions of side rails 34 of chassis 86 by placing each of the brackets 20 in position against the side rails 34, inserting bolts 54 through the appropriate holes in mounting bracket 20 which are in alignment with complementary holes in side rails 34 when the bracket 20 is properly positioned, welding mounting brackets 20 to frame rails 34 forming welds 58, 60 and 62 and tightening nuts 56 on bolts 54.

Different holes of the set of holes 36, 38, 40, 42, 44, 46 and 48 will match up with the holes in side rails 34 of various truck chassis models. For example, when mounting a mounting bracket 20 on a General Motors Corporation truck chassis, holes 36 and 44 of the embodiment illustrated in the Figures will align with complementary holes in the chassis side rails. However, when mounting a mounting bracket 20 on certain Ford truck chassis models, holes 40 and 48 will be in alignment with the complementary holes in the side rails of the chassis. Likewise, when brackets 20 are being placed on certain Dodge truck chassis models, hole 42 will align with a complementary hole in the side rails. The instructions which accompany the brackets 20 will normally instruct the installer which holes of holes 38, 40, 42, 44, 46 and 48 to align with the different truck models.

When mounting bracket 20 is properly installed on a truck chassis, flange 30 will be in one of two basic positions, depending on the chassis model on which the bracket 20 is installed. These two positions are the parallel position shown in FIG. 1 and the overlapping position shown in FIG. 2.

When mounting bracket 20 has been installed in the parallel position, the top surface of mounting flange 30 is approximately parallel to the adjacent top surface of top flange 33 of side rail 34, thus providing a level surface. When mounting bracket 20 is installed in the overlapping position, a portion of mounting flange 30 either rests directly on the extreme rear portion of side rails 34 or is spaced above side rail 34.

Of course, the positioning of mounting bracket 20 is not limited to the two positions set forth above. The possibilities of positions are virtually unlimited, the above positions being described as examples.

After a pair of mounting brackets 20 have been properly installed on chassis side rails 34, one on each side rail 34, chassis 86 and brackets 20 are ready to have a truck body, such as truck body 72, installed thereon. First, truck body 72 is lowered onto chassis 86 to a position somewhat behind the final resting position of body 72, such that the bottom flange 67 of end rail 64 clears upward extending portions 26 of mounting brackets 20 as body 72 is lowered onto chassis 86. Body 72 is then pushed forward on the truck until end rail 64 abuts the mounting brackets 20 as illustrated in FIGS. 5 and 7. When bracket 20 and end rail 64 are properly positioned, the outer tips of upwardly extending portion 26 and upper flange 32 abut against the inside of end rail 64. It is noted that brackets 20 are designed to provide the proper clearance between the truck cab and the front of truck body 72 when the body and chassis are completely assembled.

Next, the rear bolt slots in end rail 64 are aligned with slots 50 in mounting flange 30 and bolts 88 are inserted through the respective slots and loosely assembled with thick washers 90 and 92 and nut 94. Thick washers 90 are placed directly on top of end rail 64 and thick washers 92 are placed directly under mounting flange 30, as shown in FIG. 5.

Next, the front bolt slots in the truck body are aligned with complementary holes in the chassis frame and the front bolt assemblies are inserted therein (these slots, holes and bolt assemblies are not illustrated since they are standard in the industry and not a part of the invention disclosed herein). Bolts 88 and the front bolts are then tightened to the desired torque.

At this point in the truck body mounting process, the body is securely mounted on the chassis and the assembled truck is ready to have a bumper mounted thereon, for example bumper 68. The bumper type illustrated in FIG. 5 by bumper 68 is mounted on the assembled truck by centering bumper 68 on bumper mounting flanges 30 such that bumper 68 is abutting the truck body. Bumper 68 is then clamped in the proper position. Next, bumper 68 is welded to brackets 20 in various locations, such as illustrated by welds 70 in FIG. 6 and bolted to body 72 by bolt assemblies 74. Holes may have to be drilled in bumper 68 and truck body 72 to receive bolt assemblies 74.

As noted above, a second type of bumper 76 is illustrated in FIGS. 7 and 8. This type of bumper is installed on mounting brackets 20 by, as with the type represented by bumper 68, first centering bumper 76 (including recess plate 78) on brackets 20 and clamping bumper 76 in position. Next, mounting bars 80 are clamped in position bearing against and parallel to the web portion of recess plate 78. Mounting bars 80 are positioned such that they extend between brackets 20 and the ends of recess plate 78. Mounting bars 80 are then tack welded to recess plate to temporarily attach mounting bars 80 to recess plate 78.

Bumper 76 is then removed from mounting brackets 20 by releasing the clamps to enable the installer to gain easier access to the mounting bars 80/recess plate 78 interface. Once bumper 76 is removed, mounting bars 80 are securely welded to recess plate 78 in various locations, such as welds 84 shown in FIG. 8. Bumper 76 is then placed back and clamped back in the desired final assembled position. The free ends of mounting bars 80 are welded to mounting brackets 20, resulting in welds 82, as shown in FIG. 8. Lastly, bumper 76 is welded to brackets 20 and bolted to body 72.

Additional steps from the steps enumerated above may be necessary to mount some truck bodies on some truck chassis models. For example, if certain Dodge chassis are being worked with, spacers may have to be placed between the chassis and the truck body near the front of the chassis side rails. The need for and use of these spacers is well known in this industry since, in these chassis models, the front portions of the side rails are at a level below the rear portions of the side rails. In addition, other spacers may be added to the chassis as needed. Such spacers are usually recommended in the industry whenever the cargo area of the truck body will be carrying heavy loads. Other steps may be necessary, depending on the circumstances.

In the above embodiments just described, the stem portion of hook-shaped bracket 20 was provided with rearwardly extending portion 24 for attaching and accurately locating a rear bumper with respect to the chassis and body. In certain circumstances it may be unnecessary or undesirable to either use a bumper or attach it in this manner. For this reason, portion 24 is optional. As illustrated best in FIGS. 10–11, wherein parts analogous to those shown in FIGS. 1–9 are similarly numbered but with an "'", hook-shaped bracket 20' is provided. Bracket 20', its function, use, and installation procedures are the same in all respects to bracket 20 (FIGS. 1–9) as described above, except that portion 24, with its attendant flange 28 (and slots 52) is omitted; thus shortening the stem portion of the hook by eliminating portion 24 and its function. The stem portion of the hook may be further shortened, if desired, by eliminating that length of portion 22' which accommodates flange 30' and slot 50'. To do so, of course, eliminates the use of these latter parts as a bolting mechanism as shown in FIG. 5, which may not always be desirable. The remaining enumerated parts shown in FIGS. 10–11, namely, items 26', 32', 33', 34', 35', 50', 54', 56', 58', 60' and 62' are the same as, and serve the same purposes as, the items bearing like numbers in FIGS. 1–9.

The brackets according to this invention possess many advantages over the prior art brackets, supports, etc., for mounting a truck body on a truck chassis, as set forth above. The brackets provide a means for quickly and easily mounting a truck body on a truck chassis. Moreover, by using the brackets according to this invention, the installer ensures that the body will be properly positioned on the truck chassis. Furthermore, the brackets according to this invention optionally provide a surface to which a rear bumper can be quickly and easily attached.

The above describes just a few of the embodiments which this invention may assume. The elements comprising this embodiment could be varied in numerous ways and still fall within the scope of this invention.

For example, bracket 20 would not have to be a unitary piece of material, but could be made of two or more pieces of material connected together. Moreover, flanges 28 and 30 could be positioned in the same general plane, or could even comprise a single continuous flange, depending on the final configuration and location of the truck body end rail relative to the truck chassis. Other possible modifications are too numerous to recite herein.

Once given the above disclosure, many other modifications, improvements, and embodiments will become apparent to those skilled in this art. Such other modifications, improvements and embodiments are considered to be within the scope of this invention as defined by the following claims.

We claim:

1. An integral rear end bracket means for facilitating the mounting and proper positioning of a prefabricated truck body, having a generally C-shaped rearward cross-member comprised of an upper flange and a lower flange with a joining rear wall having an inner surface, onto a prefabricated truck chassis which is provided with at least one longitudinal frame member, said bracket means comprising:

a plate member having a hook-like profile comprised of a stem portion and a hook portion wherein, when mounted, the stem portion extends in a rearward, substantially longitudinal direction behind said chassis, and wherein said hook portion extends in an upward and rearward direction, said hook-like profile being of such a dimension and contour that when mounted in combination with said truck body and chassis said hook portion of said profile accommodates said cross-member and resides proximate to the inner surface of the joining wall of said C-shaped cross-member thereby preventing said body from any significant further forward movement with respect to said chassis, said hook portion being located proximal a side wall of said longitudinal frame of said chassis for connection thereto when said hook portion is proximal said inner surface of said cross-member, and wherein said bracket is of such a configuration and size that when said hook portion is proximate to the inner surface of said cross-member, said body is properly positioned with respect to said chassis.

2. An integral rear end bracket means according to claim 1 wherein said bracket means is also for facilitating the mounting and proper positioning of a rear bumper onto a prefabricated truck chassis, and wherein said stem portion of said bracket has extending therefrom a first and second flange means, said first flange means being located proximal a wall of the cross-member for connection thereto when said hook portion is proximal said inner surface of said cross-member, and wherein, when said hook portion is proximal said inner surface of said cross-member, said second flange is capable of having said rear bumper connected thereto, and wherein said bracket is of such a further configuration and size that when said hook portion is proximate to the inner surface of said cross-member, said second flange is capable of securing said bumper in a proper location with respect to said truck body and chassis.

3. A bracket means according to claim 2 wherein said first flange means is located proximal the lower flange of the cross-member for connection thereto when said hook portion is proximal said inner surface of said cross-member.

4. A bracket means according to claim 2 wherein said prefabricated chassis is provided during its prefabrication with at least one hole in a rearward portion of its longitudinal frame member and said bracket includes a plurality of holes therein, at least one of these holes aligning with said hole in the longitudinal frame member when said bracket is properly aligned thereon.

5. A bracket means according to claim 4 wherein said plurality of holes in said bracket are so arranged that at least one of said holes is aligned with a hole in the longitudinal frame member of said chassis, wherein said chassis is selected from a group of prefabricated chassis of different manufacturers, each manufacturer having a standard but different location for its particular prefabricated hole in said longitudinal frame member.

6. A bracket means according to claim 4 wherein said bracket is provided with a transition area between said hook portion and said stem portion, and said plurality of holes are located in said transition portion.

7. A mounting bracket for attaching a truck body having an end rail to one of a pair of side rails having a top flange in a truck chassis comprising:

a first portion which is attachable to said truck chassis, said first portion being flat and including means for attaching said first portion to said truck chassis, a second portion which is attachable to said truck body, said second portion comprising a first flange extending perpendicularly from said first portion, a third portion which is designed and arranged to extend upward from said first portion and engage said end rail when said bracket is properly mounted on said chassis and said body and functions as a barrier preventing forward movement of said body relative to said chassis, said third portion including a second flange which forms the top surface of said third portion, and a fourth portion designed and arranged to extend rearward of said first portion when said bracket is properly mounted on said chassis and said body, said fourth portion including a third flange disposed perpendicularly to said first portion and being designed and arranged to receive and support a bumper, said second flange being located above said first flange and said first flange being located above said third flange when said bracket is properly installed on a truck body and truck chassis, said first, second, third and fourth portions comprising a continuous member, wherein said first and third flanges are parallel to said top flange and wherein a portion of said first flange overlies said side rail when said bracket is properly mounted on said chassis and body.

8. A mounting bracket according to claim 7 wherein said attaching means includes a number of holes therein located to be compatible with a variety of holes in the side rails.

9. A mounting bracket according to claim 7 wherein the top surface of said first flange is level with the top surface of said top flange when said bracket is mounted on said chassis and body.

* * * * *

UNITED STATES PATENT AND TRADEMARK OFFICE
CERTIFICATE OF CORRECTION

PATENT NO. : 4,634,168

DATED : January 6, 1987

INVENTOR(S) : Daniel G. Fuchs; Larry R. Rudd

It is certified that error appears in the above-identified patent and that said Letters Patent is hereby corrected as shown below:

On the Title Page:

Assignee's name should read:

The Knapheide Mfg.Co.,

Signed and Sealed this

Twentieth Day of October, 1987

Attest:

DONALD J. QUIGG

Attesting Officer

Commissioner of Patents and Trademarks